(12) United States Patent
Klimpel et al.

(10) Patent No.: US 9,487,300 B2
(45) Date of Patent: Nov. 8, 2016

(54) AIRCRAFT AIR CONDITIONING SYSTEM COMPRISING A SEPARATE REFRIGERATION CYCLE

(71) Applicant: Airbus Operations GmbH, Hamburg (DE)

(72) Inventors: Frank Klimpel, Kayhude (DE); Stephan-Anton Schmidt, Hamburg (DE); Jens Beier, Drestedt (DE)

(73) Assignee: Airbus Operations GmbH (DE)

( * ) Notice: Subject to any disclaimer, the term of this patent is extended or adjusted under 35 U.S.C. 154(b) by 334 days.

(21) Appl. No.: 13/770,359

(22) Filed: Feb. 19, 2013

(65) Prior Publication Data

US 2013/0160472 A1 Jun. 27, 2013

Related U.S. Application Data

(63) Continuation of application No. PCT/EP2011/064120, filed on Aug. 17, 2011.

(60) Provisional application No. 61/375,087, filed on Aug. 19, 2010.

(30) Foreign Application Priority Data

Aug. 19, 2010 (DE) .................. 10 2010 034 830

(51) Int. Cl.
*F25B 9/06* (2006.01)
*B64D 13/08* (2006.01)
*B64D 13/06* (2006.01)

(52) U.S. Cl.
CPC ............ *B64D 13/08* (2013.01); *F25B 9/06* (2013.01); *B64D 2013/064* (2013.01); *B64D 2013/0674* (2013.01); *B64D 2013/0688* (2013.01); *Y02T 50/44* (2013.01); *Y02T 50/56* (2013.01)

(58) Field of Classification Search
CPC .......... F25B 9/004; F25B 9/06; F25B 11/02; Y02T 50/56; B64D 2013/064; B64D 2013/0674; B64D 2013/0688; B64D 13/08
USPC ...... 62/87, 238.4, 401, 402; 60/39.183, 802, 60/782, 785, 650, 682
See application file for complete search history.

(56) References Cited

U.S. PATENT DOCUMENTS 3,153,331 A * 10/1964 Rogers ........................... 62/241
4,209,993 A * 7/1980 Rannenberg ............. B60H 1/32
62/239

(Continued)

FOREIGN PATENT DOCUMENTS

CN 1898129 A 1/2007
DE 19936641 A1 3/2001

(Continued)

OTHER PUBLICATIONS

Chinese Office Action & English translation of action (Aug. 26, 2014).

*Primary Examiner* — Cassey D Bauer
*Assistant Examiner* — Kirsten Oswald
(74) *Attorney, Agent, or Firm* — Lerner, David, Littenberg, Krumholz & Mentlik, LLP

(57) ABSTRACT

An air-conditioning system for an aircraft includes a compressed air branch for conveying externally supplied and pressurized air, preferably bleed air. Furthermore, a cooling circuit for conveying preferably liquid refrigerant is provided and extends through a ram air duct. The system also includes a first heat exchanger for the heat transfer between the compressed air branch and the cooling circuit, a compressed air turbine arranged in the compressed air branch and a cooling circuit compressor arranged in the cooling circuit and mechanically coupled to the compressed air turbine. The system can have a modular design and be positioned at optimal locations in the aircraft due to the separation of the compressed air branch and the cooling circuit. In this way, the length of hot compressed air ducts can be shortened.

14 Claims, 2 Drawing Sheets

(56) References Cited

U.S. PATENT DOCUMENTS

| | | | | |
|---|---|---|---|---|
| 4,263,786 A * | 4/1981 | Eng | B64D 13/06 | 62/172 |
| 4,374,469 A * | 2/1983 | Rannenberg | B64D 13/06 | 62/172 |
| 4,419,926 A * | 12/1983 | Cronin | B64D 13/06 | 237/11 |
| 4,434,624 A * | 3/1984 | Cronin | B64D 13/06 | 62/172 |
| 4,462,561 A * | 7/1984 | Cronin | B64D 13/06 | 244/118.5 |
| 4,487,034 A * | 12/1984 | Cronin | B64D 13/06 | 62/172 |
| 4,494,372 A * | 1/1985 | Cronin | B64D 13/06 | 60/785 |
| 4,503,666 A * | 3/1985 | Christoff | B64D 13/06 | 60/39.183 |
| 4,546,939 A * | 10/1985 | Cronin | B64D 13/06 | 244/118.5 |
| 4,966,005 A * | 10/1990 | Cowell et al. | | 62/79 |
| 5,086,622 A * | 2/1992 | Warner | B64D 13/06 | 62/172 |
| 5,442,905 A * | 8/1995 | Claeys | B64D 13/06 | 454/71 |
| 5,461,882 A * | 10/1995 | Zywiak | B60H 1/00007 | 62/401 |
| 5,899,085 A * | 5/1999 | Williams | B64D 13/06 | 62/236 |
| 5,906,111 A * | 5/1999 | Lui | B64D 13/06 | 62/172 |
| 5,918,472 A * | 7/1999 | Jonqueres | B64D 13/06 | 62/172 |
| 5,956,960 A * | 9/1999 | Niggeman | B64D 13/06 | 60/785 |
| 6,128,909 A * | 10/2000 | Jonqueres | B64D 13/06 | 62/402 |
| 6,148,622 A * | 11/2000 | Sanger | B64D 13/06 | 62/402 |
| 6,182,435 B1 * | 2/2001 | Niggemann | B64D 41/00 | 60/266 |
| 6,189,324 B1 * | 2/2001 | Williams | B64D 13/06 | 62/172 |
| 6,199,387 B1 * | 3/2001 | Sauterleute | B64D 13/06 | 62/87 |
| 6,216,981 B1 * | 4/2001 | Helm | B64D 13/06 | 244/118.5 |
| 6,295,822 B1 | 10/2001 | Mueller | | |
| 6,457,318 B1 * | 10/2002 | Lui | B64D 13/06 | 62/402 |
| 6,526,775 B1 * | 3/2003 | Asfia | B64D 13/06 | 62/401 |
| 7,673,459 B2 * | 3/2010 | Sheldon | B64D 41/00 | 454/76 |
| 7,802,732 B2 | 9/2010 | Scherer et al. | | |
| 2002/0166923 A1 * | 11/2002 | Munoz | B64D 13/06 | 244/118.5 |
| 2003/0126880 A1 * | 7/2003 | Zywiak | B64D 13/06 | 62/402 |
| 2006/0059943 A1 * | 3/2006 | Merritt | B64D 13/06 | 62/402 |
| 2006/0162371 A1 * | 7/2006 | Lui | B64D 13/06 | 62/402 |
| 2007/0006607 A1 * | 1/2007 | Hunt | B64D 13/06 | 62/402 |
| 2007/0119205 A1 * | 5/2007 | Zywiak | B64D 13/06 | 62/401 |
| 2007/0193301 A1 | 8/2007 | Andres | | |
| 2008/0053126 A1 * | 3/2008 | Ebigt | B60N 2/24 | 62/237 |
| 2009/0260387 A1 * | 10/2009 | DeFrancesco | B64D 13/08 | 62/401 |
| 2011/0005244 A1 * | 1/2011 | Finney et al. | | 62/87 |

FOREIGN PATENT DOCUMENTS

| | | |
|---|---|---|
| DE | 10234968 A1 | 2/2004 |
| GB | 1459400 A | 12/1976 |
| WO | 99/02401 A1 | 1/1999 |
| WO | 2005/030579 A1 | 4/2005 |

* cited by examiner

AIRCRAFT AIR CONDITIONING SYSTEM COMPRISING A SEPARATE REFRIGERATION CYCLE

CROSS-REFERENCE TO RELATED APPLICATIONS

The present application is a continuation of International Application No. PCT/EP2011/064120, filed on Aug. 17, 2011, which claims priority from German Patent Application No. 10 2010 034 830.9 filed Aug. 19, 2010, and which claims the benefit of the filing date of U.S. Provisional Patent Application No. 61/375,087, filed on Aug. 19, 2010, the disclosures of which are hereby incorporated herein by reference.

FIELD OF THE INVENTION

The invention pertains to an air-conditioning system for an aircraft, a method for air-conditioning an aircraft and an aircraft with such an air-conditioning system.

TECHNOLOGICAL BACKGROUND

Air-conditioning systems in aircraft are usually supplied with bleed air in the form of hot compressed air that is withdrawn from a compressor stage of an engine or obtained with the aid of a compressor that is driven by an auxiliary gas turbine ("APU"). Such an air-conditioning system is known, for example, from DE 199 36 641 A1.

Such conventional air-conditioning systems are systems that operate at a high temperature and pressure level. The withdrawn bleed air has a temperature level of 200° C. and is distributed to all bleed air consumers in the aircraft via corresponding ducts. Contemporary air-conditioning systems require ram air ("ram air") as a heat sink. During the operation on the ground, a fan needs to take in air in order to cool the system. The bleed air used for the air-conditioning is cooled by means of this ram air, as well as compression, intermediate cooling and expansion of the bleed air. The air-conditioning units are usually accommodated in an unpressurized bay in the belly of the aircraft. Consequently, the duct system for the air supply in the aircraft may, if so required, have to be installed over great distances. It needs to be ensured over the entire length of the duct system that the ducts conveying the hot bleed air do not negatively affect the materials used.

Since large air-air heat exchangers are nowadays required near the bleed air circuit of the system, the air-conditioning units are usually arranged in the unpressurized bay in the belly of the aircraft such that the thermal energy can be emitted into the surroundings. However, such a heat emission is not advantageous due to the separation into pressurized and unpressurized zones and the associated large bulges in the pressurized aircraft fuselage. Since the air-conditioning system is supplied with hot bleed air, it furthermore needs to be covered with a heat shield in order to isolate and separate these hot components. If the air-conditioning unit is arranged in a zone that contains kerosene vapor, sufficient ventilation of the unpressurized bay ("UBV—Unpressurized Bay Ventilation") furthermore needs to be ensured.

Cabin zones are supplied with air on a temperature level that is defined by the cabin zone with the lowest required temperature level. Since this air is excessively cold for the remaining cabin zones, hot trim air ("trim air") is supplied to each cabin and cockpit zone in order to reach the nominal temperature in the cabin zones. In addition to the disadvantageous energy balance, it also needs to be taken into account that the ducts for the hot trim air need to be carefully integrated into the pressurized zone in order to prevent negative effects on less temperature-resistant materials that are nowadays used more and more frequently in aircraft such as, for example, plastics reinforced with carbon fibers.

BRIEF SUMMARY OF THE INVENTION

One embodiment of the invention includes an air-conditioning system comprising a compressed air branch for conveying externally supplied and pressurized air, a cooling circuit for conveying refrigerant that extends through a ram air duct, a first heat exchanger for the heat transfer between the compressed air branch and the cooling circuit, a compressed air turbine that is arranged in the compressed air branch, as well as a cooling circuit compressor that is arranged in the cooling circuit and mechanically coupled to the compressed air turbine. Due to this design, a hybrid air cooling system for a passenger aircraft is created, in which a fresh air supply is combined with another cooling system. Due to the division into the compressed air branch and the separate cooling circuit, the air-conditioning system can be divided into modules that can be flexibly positioned and arranged at different locations in the aircraft, wherein a ram air duct may, for example, be arranged in the belly of the aircraft and the air-conditioning unit with the heat exchanger for cooling the bleed air may be arranged in the tail section of the aircraft, or wherein the turbine and compressor unit may be separated from the ram air cooling circuit. Consequently, the heat exchangers for cooling the hot bleed air can be positioned as close as possible to the engines and therefore the bleed air withdrawal point such that the length of hot bleed air ducts for the air supply of the air-conditioning system can be reduced, particularly in aircraft with engines positioned on the tail section, and only a short hot bleed air duct near the engine is required. This is advantageous when using temperature-critical materials such as, for example, plastic reinforced with carbon fibers because this embodiment requires fewer temperature-shielding measures. All in all, the dimensions of the system and its weight can be minimized with smaller heat exchangers. The transfer of hot air within the air-conditioning system can be reduced due to the shortened hot ducts, wherein this has the effect that ignitability no longer exists below 200° C. Due to the flexibility in positioning the system, the hot components can also be positioned distant from the fuel tanks in order to reduce the safety measures such as heat shields, insulations or overheating sensor systems. In addition, the ventilation of the unpressurized belly region of the aircraft can be optimized because fewer hot components exist underneath the central wing tank. Another advantage can be seen in that the cooling circuit does not necessarily require a heavy-duty electrical unit such as, for example, a motor-driven compressor because the cooling circuit compressor may be driven with energy that is thermodynamically obtained from the bleed air—i.e., the cooling circuit compressor may be designed such that it can be driven without an electric motor or without an electric drive.

According to another embodiment of the invention, the air-conditioning system comprises a second heat exchanger for the heat transfer between the compressed air branch and the cooling circuit. The air-conditioning system furthermore comprises a cooling circuit turbine that is arranged in the cooling circuit and downstream of the second heat exchanger referred to an intended refrigerant flow direction. This embodiment provides the advantage that additional mechanical energy is available due to the incorporation of the cooling circuit turbine and the expansion taking place therein, wherein this additional mechanical energy can be used for driving the cooling circuit compressor. This results in a higher compression of the refrigerant in the cooling circuit compressor such that the temperature of the refrigerant can be increased to approximately 120° C. This relatively high temperature of the refrigerant at the inlet into a condenser arranged in the ram air duct is advantageous with respect to an adequate heat emission due to the high temperature difference between the ambient air in the ram air duct and the refrigerant. This higher temperature difference has the advantage that a smaller ram air mass flow than that of contemporary ram air ducts suffices for cooling the refrigerant. A reduced consumption of ram air is particularly advantageous during the operation on the ground, in which the air flow is taken in by a fan. In addition, the refrigerant-air heat transfer is more efficient such that the heat exchanger in the ram air duct can be realized smaller. The $c_w$-value of the aircraft can be improved due to the reduced ram air mass flow.

According to another advantageous embodiment of the invention, a control device for limiting a refrigerant flow through the first heat exchanger is provided. This has the advantage that the temperature of the compressed air flow at the outlet from the first heat exchanger can be adjusted. The compressed air flow has a certain humidity that depends on its temperature. Different quantities of water therefore can be withdrawn from the compressed air flow in a downstream water separator of the compressed air branch depending on the adjustment of the control device such that the humidity of the fresh air to be supplied to the cabin can be adjusted by means of the control device.

According to another embodiment of the invention, the air-conditioning system is furthermore provided with an electric drive that is mechanically coupled to the cooling circuit compressor. In this way, the cooling circuit compressor may be completely or supportingly driven by the electric drive during the operation of the aircraft on the ground and while the engines are at a standstill. This broadens the scope of application of the air-conditioning system.

According to another embodiment of the invention, an air-conditioning system is proposed that furthermore comprises a cold air distributor with several cooling circuit branches that are connected in parallel and in which a heat exchanger is respectively arranged, wherein said heat exchanger is positioned in an air flow duct assigned to the respective cooling circuit branch such that an air flow for respectively air-conditioning a certain region of the aircraft can be separately adapted or conditioned. Due to this design, a hybrid air cooling system is created, in which a fresh air supply and another cooling system are combined with a zonal temperature control. This furthermore allows the combination of systems such as, for example, a supplemental cooling system "(supplemental cooling")", an air distribution system, a zonal cabin temperature control and an avionics cooling system. In presently used air-air cooling systems without the vapor cooling circuit proposed in this application, it was furthermore required to adapt the bleed air introduced into the passenger cabin to the cabin zone with the lowest required temperature, i.e., the hottest cabin zone defined the required cooling power. However, the cold bleed air provided was excessively cold for the remaining cabin zones that were cooler such that additional hot trim air ("trim air") had to be introduced into these remaining cabin zones, namely in such quantities that the target temperature may be reached. The advantage of a zonal cooling of the cabin can be achieved with this embodiment. Consequently, each zone can be individually and directly cooled to the target temperature without requiring trim air. In this embodiment, a zonal cooling of the cooling circuit replaces the trim air system. This elimination of the trim air lowers the energy consumption in comparison with contemporary air-conditioning systems. The energy consumption is also lowered due to the fact that the bleed air flow no longer needs to be adapted to the cabin zone with the highest energy requirement such that the bleed air pressure can be lowered and less ram air is required. Hot trim air ducts become unnecessary and simplify the installation and the use of less heat-resistant materials.

According to another embodiment of the invention, the air-conditioning system furthermore comprises a first cooling circuit section, in which the first heat exchanger is arranged, and a second cooling circuit section, in which the second heat exchanger and the cooling circuit turbine are arranged, wherein the first and the second cooling circuit sections are connected in parallel. This provides the aforementioned advantage associated with the incorporation of a cooling circuit turbine.

According to another advantageous embodiment, the air-conditioning system is designed in such a way that a refrigerant in the cooling circuit is largely in a liquid state of aggregation, preferably by more than 90%, downstream of a refrigerant reservoir and upstream of the first heat exchanger referred to an intended refrigerant flow direction. This increases the efficiency of the system because the refrigerant-compressed air heat transfer makes it possible to realize the cooling with an improved degree of efficiency.

According to another advantageous embodiment, the air-conditioning system is provided with a third heat exchanger for heat recovery purposes, wherein one passage of the third heat exchanger is connected to the compressed air branch upstream of the first heat exchanger referred to an intended compressed air flow direction and a separate passage thereof is connected to the compressed air branch downstream of the compressed air turbine referred to an intended compressed air flow direction. This third heat exchanger makes it possible to once again heat the compressed air from the very cold temperature level of, for example, −17° C. to −30° C. downstream of the compressed air turbine to a comfortable level for the passengers before it is introduced into the cabin. In addition, the formation of ice on the cabin air outlet can be prevented in this fashion.

According to another embodiment, the air-conditioning system is furthermore provided with a refrigerant reservoir that is arranged in the cooling circuit and serves for storing refrigerant. This makes it possible to use liquid refrigerant in the cooling circuit. In addition, the refrigerant reservoir serves as a compensation tank for compensating volume changes of the refrigerant.

According to another embodiment, the air-conditioning system comprises a water separator for withdrawing water that can be fed to the ram air duct from the compressed air branch. This has the advantage that the water in the ram air duct can absorb a large amount of thermal energy due to its low temperature when it encounters the condenser and therefore adequately cool the refrigerant in the cooling circuit.

According to another embodiment, the air-conditioning system comprises a single ram air duct that contains two ram air heat exchangers, each of which is assigned to a cooling circuit of a different air-conditioning unit. As already mentioned above, the invention makes it possible to install a heat exchanger with smaller dimensions in the ram air duct. The two ram air heat exchangers can therefore be combined, wherein this may not be realized until now due to the dimensions. In addition, a single ram air duct provides the advantage of being able to use a single common fan instead of the two fans that would be required otherwise. This fan may have a larger diameter, would require less power and be more economical.

All in all, the total weight of the air-conditioning system can be reduced with individual above-described embodiments and a combination of the above-described embodiments.

The aforementioned advantages may also be met by the method for air-conditioning an aircraft according to the invention and with an aircraft with such an air-conditioning system.

According to one embodiment, the invention proposes an aircraft, in which the air-conditioning system is accommodated in the aircraft in such a way that a cargo and/or passenger cabin area is situated between the ram air duct and an air-conditioning unit containing the first heat exchanger. This provides the aforementioned advantages of a modular design and the associated option of flexibly positioning the air-conditioning system.

Preferred exemplary embodiments of the invention are described below with reference to the figures.

DETAILED DESCRIPTION

Other features, advantages and possible applications of the present invention result from the following detailed description of preferred exemplary embodiments and the figures. In this respect, all described and/or graphically illustrated characteristics form aspects of the invention individually and in arbitrary combination—namely regardless of their concretely claimed combination or references of the claims to other claims. In the figures, identical or similar elements are furthermore identified by the same reference symbols. Specifications such as "upstream," "downstream," "preceding" or "following" respectively refer to the intended fluid flow direction in the respective compressed air branch, refrigerant circuit or ram air duct.

Figure 1:
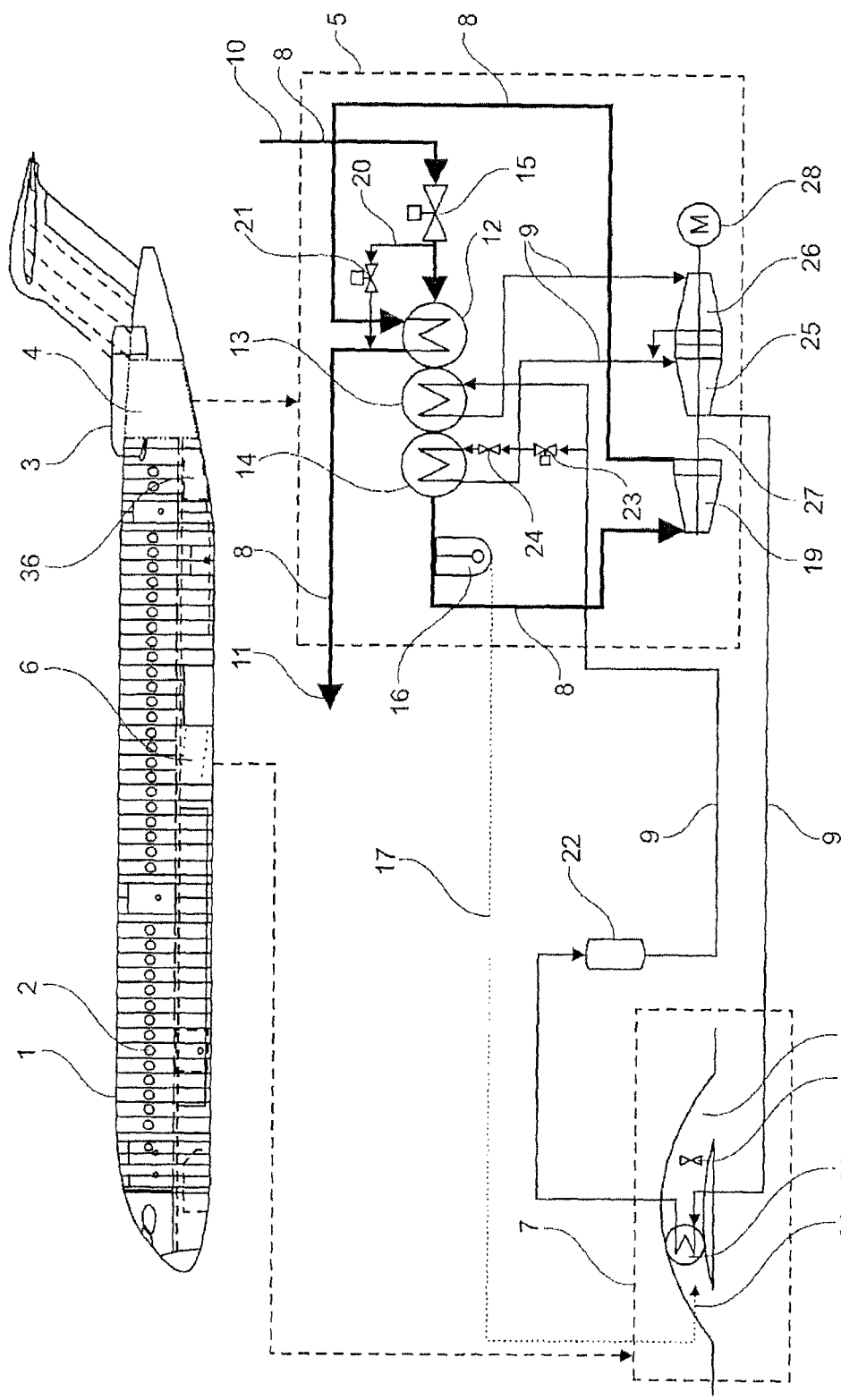
FIG. 1 shows a schematic design of the air-conditioning system for aircraft.

FIG. 1 shows a schematic design of the air-conditioning system for an aircraft. In this illustration, this aircraft is represented by an airplane 1 with a pressurized cabin 2 and engines 3. Two air-conditioning units 5 are arranged in a tail section 4 of the airplane 1 that lies behind a cabin referred to the direction of flight for reasons of redundancy, wherein one of these air-conditioning units is drawn with dashed lines in FIG. 1 and described in greater detail below. An unpressurized bay ("UBV—Unpressurized Bay Ventilation") is arranged in a bay 6 in the belly of the aircraft, i.e., a central underfloor region of the fuselage between the two airfoils, wherein this unpressurized bay is framed with a dashed line 7 in FIG. 1. The air-conditioning system comprises a compressed air branch 8 and a cooling circuit 9 that is hermetically separated from the compressed air branch, wherein the compressed air branch and the cooling circuit consist of pipe systems, in which the elements described below are provided. An inlet 10 of the compressed air branch 8 can be supplied with compressed air, preferably bleed air that can be conventionally withdrawn from an engine 3 or a not-shown auxiliary power unit ("APU"). Conditioned fresh air can be withdrawn from an outlet 11 of the compressed air branch 8. A third heat exchanger 12 for heat recovery purposes, an evaporator 13 in the form of a second heat exchanger pursuant to the claims and an evaporator 14 in the form of a first heat exchanger pursuant to the claims are connected in series in the compressed air branch 8 referred to an intended flow direction of the compressed air. A flow control valve 15 that makes it possible to control the volume flow of compressed air precedes these three series-connected heat exchangers 12, 13, 14. The evaporator 14 is followed by a water separator 16 that makes it possible to withdraw water 17 from the compressed air branch 8 and to feed this water to a ram air duct 18. A compressed air turbine 19 is provided farther downstream in the compressed air branch 8, i.e., following the water separator 16. After extending through the compressed air turbine 19, the compressed air branch 8 leads into the heat exchanger 12, but this time through the passage that is hermetically separated from the aforementioned upstream passage of the heat exchanger 12. In the following description, the two separated branches of the heat exchanger 12 are distinguished as an upstream and a downstream passage. After exiting the downstream passage of the heat exchanger 12, the compressed air branch 8 continues to the outlet 11. A bypass line 20 connected to the outlet side of the flow control valve 15 directly connects the outlet side of the flow control valve 15 to the outlet 11 and thereby bypasses the remaining above-described components of the compressed air branch 8. This bypass line 20 contains a temperature control valve 21 that assists in controlling the temperature of the conditioned fresh cabin air. The farther the temperature control valve 21 is opened, the more hot compressed air bypasses the cooling components heat exchanger 12, evaporator 13, evaporator 14 and compressed air turbine 19 and consequently heats the conditioned fresh air.

The closed cooling circuit 9 is hermetically separated from this compressed air branch 8. This cooling circuit 9 is provided with a refrigerant reservoir 22, in which refrigerant can be stored in the liquid state of aggregation. The cooling circuit divides into two parallel cooling circuit sections downstream of the refrigerant reservoir 22. A cooling valve 23 is provided in the first of these cooling circuit sections. This cooling valve 23 is followed by a restrictor 24. Downstream of the restrictor 24, this cooling circuit section extends through the evaporator 14, namely in a cooling circuit passage of the evaporator 14 that is hermetically separated from the compressed air passage of the evaporator 14. On the outlet side of the cooling circuit passage of the evaporator 14, the cooling circuit 9 passes through a cooling circuit compressor 25. The second of the aforementioned parallel cooling circuit sections extends parallel to this described cooling circuit section that contains the cooling valve 23, the restrictor 24 and the evaporator 14. This second cooling circuit section branches off on the inlet side of the cooling valve 23 and extends through a cooling circuit passage of the evaporator 13 that is hermetically separated from the compressed air passage of the evaporator 13. On the outlet side of the evaporator 13, the cooling circuit 9 continues to a cooling circuit turbine 26, the outlet of which is connected to the inlet of the cooling circuit compressor 25 such that the two parallel cooling circuit sections are combined at this location. The cooling circuit turbine 26, the cooling circuit compressor 25 and the compressed air turbine 19 are mechanically coupled to one another by means of a common drive shaft 27. An electric drive such as, e.g., an electric motor that temporarily can solely or supportingly drive the drive shaft 27 and therefore the cooling circuit compressor 25 can furthermore be coupled to this common drive shaft 27.

On the outlet side of the cooling circuit compressor 25, the cooling circuit 9 continues to a condenser 29 or generally a heat exchanger arranged in the ram air duct 18. The ram air duct 18 is an air duct in the belly of the aircraft that originates at the outside contour of the aircraft fuselage, then extends inward and ultimately outward again at a location that lies farther toward the rear referred to the longitudinal direction of the aircraft. The air flow generated while flying causes the condenser 29 to cool such that thermal energy can be transferred to the air flowing around the aircraft at this location. A water injector 30 is arranged in the ram air duct 18 upstream of the condenser 29 and makes it possible to inject water 17 from the water separator 16 into the ram air duct 18 such that it is entrained by the air flow and encounters the condenser 29. A fan 31 is provided in the ram air duct 18 downstream of the condenser 29 in order to generate an additional flow or to generate a flow while the airplane 1 is on the ground. On its outlet side, the condenser 29 is connected to the refrigerant reservoir 22. Alternatively or additionally to transferring the thermal energy to the air flowing around the aircraft by means of the condenser 29, this thermal energy (compressed air heat, as well as cabin heat in the exemplary embodiment according to FIG. 2 described below) may also be used for aircraft systems, in which thermal energy is required. For example, the thermal energy may be entirely or partially used for heating drinking water or generally for raising the enthalpy of thermal energy carriers. For this purpose, an additional condenser would be provided in the cooling circuit 9 in series with the condenser 29, preferably upstream or downstream thereof, wherein this additional condenser is arranged in a duct that either conveys the medium to be heated itself or an air flow that heats the medium to be heated. In another conceivable exemplary embodiment, the ram air duct 18 is completely eliminated and the thermal energy is exclusively used within the airplane 1 in order to raise the enthalpy of thermal energy carriers.

The very hot compressed air flow at the inlet 10 with a temperature of approximately 200° C. flows through the flow control valve 15 that, as already mentioned above, makes it possible to control the volume flow and then passes through the compressed air passage of the heat exchanger 12, the compressed air passage of the evaporator 13 and the compressed air passage of the evaporator 14 in this sequence such that the compressed air flow is cooled by these three components in such a way that it has a much lower temperature of, for example, 15° C. on the outlet side of the evaporator 14. This significantly cooled compressed air flow contains condensed water that can be fed to the water injector 30 via the water separator 16 and, due to its low temperature, absorb a significant amount of thermal energy when it encounters the condenser 29 in order to support the cooling of the refrigerant in the cooling circuit 9. Downstream of the water separator 16, the cooled compressed air flow encounters the compressed air turbine 19 and is expanded therein. This generates mechanical power that is used for driving the cooling circuit compressor 25 via the common drive shaft 27 and also causes further cooling of the compressed air flow. Downstream of the compressed air turbine 19, the compressed air in the compressed air branch 8 is additionally conveyed to the heat exchanger 12, in which the significantly cooled compressed air encounters the very hot compressed air flowing through the upstream passage of the heat exchanger 12, namely in the downstream passage of the heat exchanger 12. This causes the compressed air exiting the downstream passage of the heat exchanger 12 to be heated and the compressed air flowing through the upstream passage of the heat exchanger 12 to be cooled. After exiting the downstream passage of the heat exchanger 12 at the outlet 11, the conditioned fresh cabin air is ultimately introduced into the pressurized cabin of the airplane 1 and used for air-conditioning purposes.

In the cooling circuit 9, the refrigerant in the refrigerant reservoir 22 initially is in a liquid state of aggregation and has a temperature of, for example, 30° C. to 35° C. From there, the refrigerant branches off to the cooling valve 23 on the one hand and to the inlet side of the cooling circuit passage of the evaporator 13 on the other hand. The volume flow of the refrigerant flowing through the cooling circuit passage of the evaporator 14 can be controlled with the cooling valve 23 and the restrictor 24 arranged downstream thereof. This causes the refrigerant passing through the evaporator 13 to have a higher pressure than the refrigerant flowing through the evaporator 14. The refrigerant evaporates while passing through the evaporators 13 and 14 and therefore is in a gaseous state of aggregation and has a high temperature at their outlets. The refrigerant vapor exiting the evaporator 14 is compressed in the cooling circuit compressor 25 and therefore additionally heated. The power for the compression is largely generated by the compressed air turbine 19, i.e., by the expansion of the compressed air in the compressed air branch 8. The refrigerant vapor exiting the evaporator 13 encounters the cooling circuit turbine 26 and is expanded therein such that it is cooled on the one hand and mechanical power is released on the other hand, wherein this mechanical power is used for driving the cooling circuit compressor 25 via the common drive shaft 27 and therefore supports the compressed air turbine 19 in driving the cooling circuit compressor 25. The refrigerant vapor exiting the cooling circuit compressor 25 is significantly cooled and condensed in the condenser 29 such that it is once again in a liquid state of aggregation on the outlet side of the condenser 29. This liquid refrigerant is returned to the refrigerant reservoir 22 and then once again available for cooling the compressed air flow.

Figure 2:
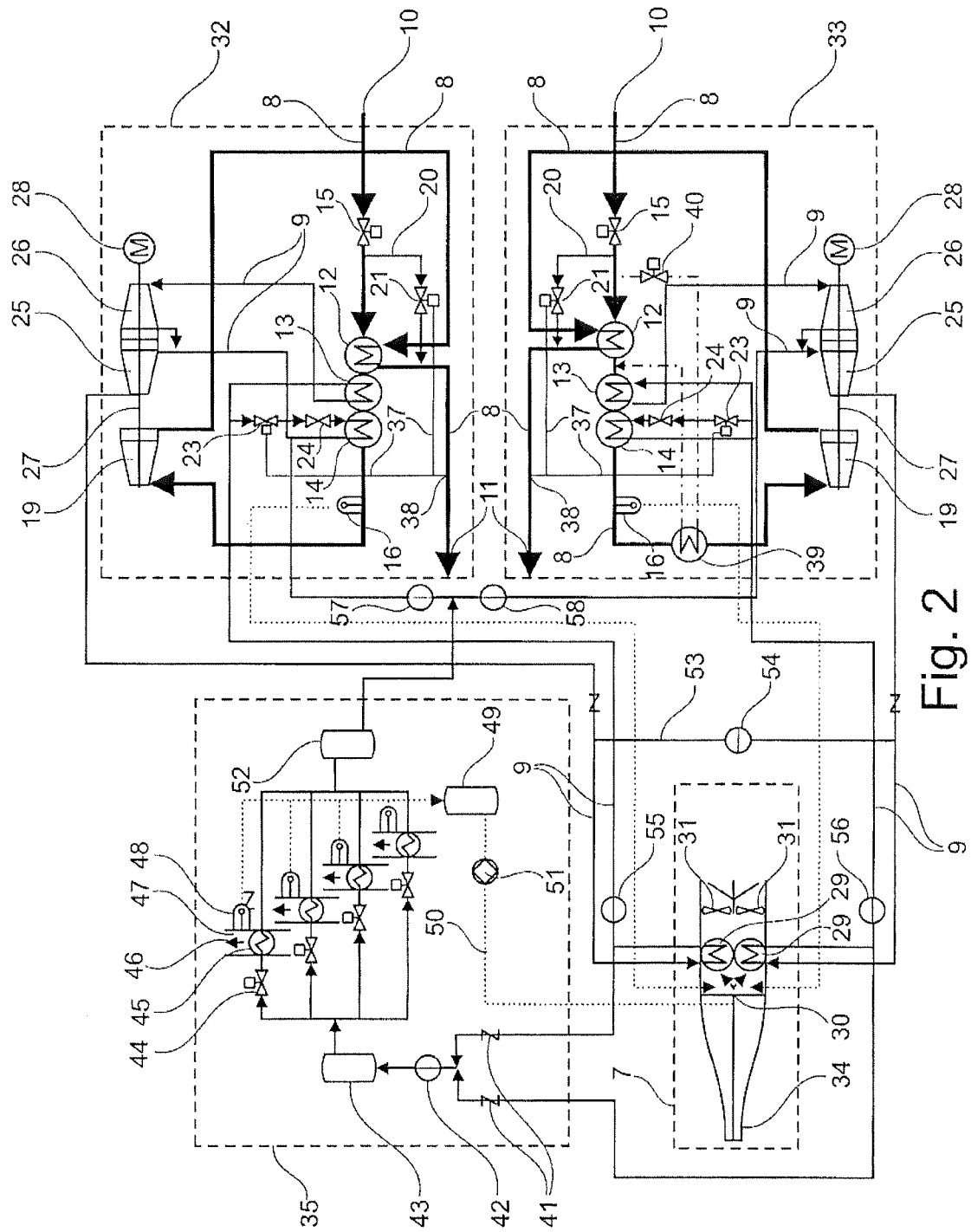
FIG. 2 shows a schematic diagram of the air-conditioning system in the form of a redundantly designed overall system.

FIG. 2 shows a schematic diagram of the air-conditioning system, wherein two air-conditioning units 32 and 33, as well as a ram air duct 34 that is composed of two ram air duct halves, are provided for reasons of redundancy. In comparison with FIG. 1, a cold air manifold 35 framed with a dashed line is additionally provided in FIG. 2. This cold air manifold ("cold air manifold") is arranged in the airplane 1 in an underfloor region 36 directly in front of the tail section 4 (see FIG. 1).

With respect to its design and function, the air-conditioning unit 32 essentially corresponds to the air-conditioning unit 5 described in connection with FIG. 1 such that the description of the air-conditioning unit 5 also applies in its entirety to the air-conditioning unit 32. In addition to the illustration in FIG. 1, the control link between the cooling valve 23 and the temperature control valve 21 is also shown in FIG. 2, namely in the form of lines 37 indicating that the control of the temperature control valve 21 and the control of the cooling valve 23 depend on at least one process variable 38 at the outlet 11 of the compressed air flow. In other words, the temperature control valve 21 and the cooling valve 23 are at least partially controlled in dependence on the state of the conditioned fresh cabin air. In practical applications, two air-conditioning units of preferably identical design are provided for reasons of redundancy.

At this point, however, an optional modification of the air-conditioning units is described. In addition to the design of the air-conditioning unit 32, the air-conditioning unit 33 also has another heat exchanger 39 for heat recovery purposes, wherein one passage of this additional heat exchanger is arranged in the compressed air branch 8 between the water separator 16 and the compressed air turbine 19 and its passage that is hermetically separated therefrom extends parallel to the upstream passage of the heat exchanger 12. A flow control valve 40 is arranged upstream or downstream of the latter-mentioned passage of the heat exchanger 39 in order to adjust the distribution ratio of the volume flow to the respective heat exchangers 12 and 39. The heat exchanger 39 provides additional control options in order to realize a more optimal air-conditioning process.

The ram air duct 34 in FIG. 2 essentially consists of two ram air duct halves that are realized in a mirror-inverted fashion and respectively correspond to the design of the air duct 18 in FIG. 1. The modular design of the air-conditioning system and the associated option of separately positioning the ram air duct 34 and the air-conditioning units 32, 33 make it possible to combine the redundant air duct halves into one common ram air duct 34. Alternatively to the design consisting of two ram air duct halves that are realized in a mirror-inverted fashion and respectively correspond to the design of the air duct 18 in FIG. 1, it would also be possible to use only a single common fan instead of the two fans 31. This fan may have a larger diameter, would require less power and be more economical.

The cold air manifold 35 is connected in parallel to the outlet side of the condenser 29 and to the inlet side of the cooling circuit compressor 25. The two redundant lines arriving from the outlet of the condenser 29 therefore lead into the cold air manifold 35, in which each of these two branches is initially provided with a throttle 41 that makes it possible to adjust the volume flow to be introduced into the cold air manifold 35 in relation to the volume flow to be fed to the evaporators 13 and 14. The supply lines are combined downstream of the two throttles 41 and encounter a shut-off valve 42, by means of which the cold air manifold 35 connected in parallel to the air-conditioning units 32 and 33 can be excluded from the air-conditioning process. An inlet reservoir 43 is provided downstream of the shut-off valve 42 and makes it possible to separate vaporous and liquid components of the refrigerant from one another. After the inlet reservoir 43, the refrigerant flow is divided into parallel branches that are all designed identically. Each of these branches serves for cooling a different system and/or a different cabin zone. On the inlet side, each of these branches is provided with a flow control valve 44 that makes it possible to control the volume flow. This flow control valve is followed by a heat exchanger 45 that cools an air flow 46 in an air flow duct 47. The air flow 46 can be fed to different systems such as, for example, a temperature control system ("TCS—Temperature Control System"), a recirculation air cooling system ("RC—Recirculation Air Controlling"), a supplemental cooling system ("SCS—Supplemental Cooling System"), an avionics cooling system ("AVCS—Avionics Cooling System") or a cooling system for generating inert gas ("CSAS—Conditioned Service Air Supply"). The air flow 46 may consist, for example, of recirculation air that is withdrawn from a certain cabin zone and once again introduced into the corresponding cabin zone after passing through the heat exchanger 45. The refrigerant therefore is not only the energy carrier for cooling the compressed air (preferably bleed air), but also for the cabin heat that can be withdrawn from the cabin with the recirculation air. A water separator 48 is respectively provided in the air flow duct 47 downstream of the heat exchanger 45 referred to the air flow direction, wherein this water separator withdraws the water content from the air flow and supplies this water to a water collector 49. From this water collector 49, water 50 is conveyed to the water injector 30 arranged in the ram air duct 34 through a line with the aid of a pump 51. On the outlet side, the heat exchangers in the refrigerant branch are connected to one another and lead to an outlet reservoir 52, in which a separation of the refrigerant into vaporous and liquid components is realized. The outlet side of the outlet reservoir 52 is divided into two branches, wherein one branch leads to the inlet side of the cooling circuit compressor 25 of the air-conditioning unit 32 and the other branch leads to the inlet side of the cooling circuit compressor 25 of the air-conditioning unit 33.

The cooling circuit 9 of the air-conditioning unit 32 and the cooling circuit 9 of the air-conditioning unit 33 are connected to one another via a compensation line 53 such that refrigerant can be exchanged between these cooling circuits. If one of these air-conditioning units 32, 33 needs to be switched off in case of a defect or malfunction, a separation of the respective air-conditioning unit 32, 33 can be realized by means of shut-off valves 54-58. If the air-conditioning unit 32 should be excluded from the cooling process, the shut-off valves 54, 55 and 57 are closed. The shut-off valves 54, 56 and 58 need to be closed in order to separate the air-conditioning unit 33.

In other words, the design and the function of the air-conditioning system can be described as follows. The air-conditioning system is divided into an air circuit and a vapor circuit. In the air circuit, an air-to-air heat exchanger cools the pressurized bleed air for heat recovery purposes. The air is cooled in a first stage evaporator and a second stage evaporator. Downstream of the second stage evaporator, the air is expanded in an air turbine that provides the technical power for the vapor circuit process. In the vapor circuit process, a compressor takes in refrigerant vapor and raises its pressure level. The pressurized vapor is fed to a condenser that is arranged in a ram air duct, wherein the ram air duct is once again accommodated in a belly fairing of the aircraft. The condenser transfers the thermal energy to the ram air taken in through the ram air duct. During the operation on the ground, air is taken in through the ram air duct by means of an electric fan. The liquid refrigerant is conveyed into a reservoir located downstream of the condenser. A cooling valve is provided for controlling the mass flow of liquid refrigerant to a restrictor in order to adjust the cooling power of the following second stage evaporator. The liquid is evaporated in the second stage evaporator and then taken in by a vapor circuit compressor. The second stage evaporator is operated above a temperature of 10° C. such that, in contrast to conventional vapor circuit processes, no ice is formed during ground conditions and the heating processes associated therewith and sufficient free water is separated upstream of the turbine. Liquid refrigerant is also conveyed to the first stage compressor, in which the liquid is evaporated and subsequently expanded in the vapor circuit turbine. The technical power generated by the vapor circuit turbine is used for increasing the efficiency of the vapor circuit compressor. The air-conditioning system can be split into two parts. The air circuit process driven by bleed air is installed near the engines in order to avoid long and hot bleed air ducts. Heat transfer means with respect to the air cooling process are positioned at the location of the aircraft, at which the highest ram air pressure can be reached.

The air-conditioning system according to the invention can also be combined with other aircraft systems. Due to the integrated air circuit process, the hybrid system can share the cooling power with the supplemental cooling system (galley cooling) with the aid of a separate relief valve unit, for example, in order to cool a refrigerant. In addition, the system may serve as a cooling system for generating inert gas ("Cooled-Service-Air-Supply") in order to generate inert gas to be introduced into the fuel tanks. This leads to a reduction of components for a cooling system for generating inert gas (CSAS-components).

As a supplement, it is noted that characteristics or steps that were described with reference to one of the above additional developments can also be used in combination with other characteristics or steps of other above-described additional developments. Reference symbols in the claims should not be interpreted in a restrictive sense.

LIST OF REFERENCE SYMBOLS

1 Aircraft, preferably airplane
2 Pressurized cabin
3 Engine
4 Tail section
5 Air-conditioning unit
6 Bay in belly of aircraft
7 Unpressurized bay ("UBV - Unpressurized Bay Ventilation")
8 Compressed air branch
9 Cooling circuit
10 Compressed air inlet
11 Compressed air outlet
12 Third heat exchanger for heat recovery purposes
13 Second heat exchanger, preferably evaporator
14 First heat exchanger, preferably evaporator
15 Flow control valve
16 Water separator
17 Water
18 Ram air duct
19 Compressed air turbine
20 Bypass line
21 Temperature control valve
22 Refrigerant reservoir
23 Cooling valve
24 Restrictor
25 Cooling circuit compressor
26 Cooling circuit turbine
27 Drive shaft
28 Electric drive
29 Ram air duct heat exchanger, preferably condenser
30 Water injector
31 Fan
32 Air-conditioning unit
33 Air-conditioning unit
34 Ram air duct
35 Cold air manifold
36 Underfloor region
37 Control link
38 Process variable
39 Heat exchanger
40 Flow control valve
41 Throttle
42 Shut-off valve
43 Inlet reservoir
44 Flow control valve
45 Heat exchanger
46 Air flow
47 Air flow duct
48 Water separator
49 Water collector
50 Water
51 Pump
52 Outlet reservoir
53 Compensation line
54 Shut-off valve
55 Shut-off valve
56 Shut-off valve
57 Shut-off valve
58 Shut-off valve

The invention claimed is:

1. An air-conditioning system for an aircraft, comprising:
a compressed air branch for conveying externally supplied and pressurized air;
a cooling circuit for conveying refrigerant, the cooling circuit extending through a ram air duct and comprising a first cooling circuit section and a second cooling circuit section;
a first heat exchanger arranged in the first cooling circuit section and a second heat exchanger arranged in the second cooling circuit section, each configured to transfer heat between the compressed air branch and the cooling circuit;
a compressed air turbine arranged in the compressed air branch;
a cooling circuit compressor arranged in the first cooling circuit section and mechanically coupled to the compressed air turbine; and
a cooling circuit turbine arranged in the second cooling circuit section downstream of the second heat exchanger in a refrigerant flow direction;
wherein the first cooling circuit section and the second cooling circuit sections are connected in parallel to one another;
wherein the cooling circuit turbine, the cooling circuit compressor and the compressed air turbine are mechanically coupled to one another by a common drive shaft; and
wherein an outlet of the cooling circuit turbine is connected to an inlet of the cooling circuit compressor.

2. The air-conditioning system of claim 1, further comprising:
a control device for limiting the refrigerant flow through the first heat exchanger.

3. The air-conditioning system of claim 1, further comprising:
an electric drive mechanically coupled to the cooling circuit compressor.

4. The air-conditioning system of claim 1, further comprising:
a cool air manifold with a plurality of cooling circuit branches connected in parallel to one another, wherein a heat exchanger is respectively arranged in each of the cooling circuit branches and positioned in an air flow duct assigned to the respective cooling circuit branch in such a way that an air flow for respectively air-conditioning a certain region of the aircraft and/or aircraft system is separately conditionable.

5. The air-conditioning system of claim 1, wherein the refrigerant in the cooling circuit is in a liquid state of aggregation upstream of the first heat exchanger in a refrigerant flow direction.

6. The air-conditioning system of claim 1, further comprising:
   a third heat exchanger, one passage of which is connected to the compressed air branch upstream of the first heat exchanger in a compressed air flow direction and a separate passage thereof is connected to the compressed air branch downstream of the compressed air turbine in the compressed air flow direction.

7. The air-conditioning system of claim 1, further comprising:
   a refrigerant reservoir arranged in the cooling circuit for storing refrigerant.

8. The air-conditioning system of claim 1, further comprising:
   a water separator for withdrawing water from the compressed air branch.

9. The air-conditioning system of claim 1, further comprising:
   a single ram air duct containing first and second ram air heat exchangers respectively in communication with a cooling circuit of a different air-conditioning unit.

10. A method for air-conditioning an aircraft, comprising:
    supplying and pressurizing external air, as well as conveying the pressurized air in a compressed air branch;
    cooling refrigerant conveyed in a cooling circuit in a ram air duct, the cooling circuit comprising a first cooling circuit section and a second cooling circuit section connected in parallel to one another;
    transferring heat between the compressed air branch and the cooling circuit by a first heat exchanger arranged in the first cooling circuit section;
    transferring heat between the compressed air branch and the cooling circuit by a second heat exchanger arranged in the second cooling circuit section;
    expanding air in a compressed air turbine arranged in the compressed air branch;
    driving a cooling circuit compressor arranged in the first cooling circuit section by the compressed air turbine and by a cooling circuit turbine arranged in the second cooling circuit section downstream of the second heat exchanger in a refrigerant flow direction wherein the outlet of the cooling circuit turbine is connected to the inlet of the cooling circuit compressor such that the parallel first and second cooling circuit sections are connected to one another.

11. An aircraft with an air-conditioning system comprising:
    a compressed air branch for conveying externally supplied and pressurized air;
    a cooling circuit for conveying refrigerant, the cooling circuit extending through a ram air duct and comprising a first cooling circuit section and a second cooling circuit section;
    a first heat exchanger arranged in the first cooling circuit section and a second heat exchanger arranged in the second cooling circuit section, each configured to transfer heat between the compressed air branch and the cooling circuit;
    a compressed air turbine arranged in the compressed air branch;
    a cooling circuit compressor arranged in the first cooling circuit section and mechanically coupled to the compressed air turbine; and
    a cooling circuit turbine arranged in the second cooling circuit section downstream of the second heat exchanger in a refrigerant flow direction;
    wherein the first cooling circuit section and the second cooling circuit sections are connected in parallel to one another;
    wherein the cooling circuit turbine, the cooling circuit compressor and the compressed air turbine are mechanically coupled to one another by a common drive shaft; and
    wherein an outlet of the cooling circuit turbine is connected to an inlet of the cooling circuit compressor.

12. The aircraft of claim 11, wherein the air-conditioning system is accommodated in the aircraft in such a way that a cargo and/or passenger cabin area is situated between the ram air duct and an air-conditioning unit containing the first heat exchanger.

13. The aircraft of claim 11, comprising a plurality of zones, which are coolable to a target temperature by a cooling circuit based zonal cooling individually and directly without the use of trim air.

14. The aircraft of claim 13,
    wherein the aircraft comprises a cold air manifold for the cooling circuit based zonal cooling, the cold air manifold comprising a plurality of parallel cooling circuit branches,
    wherein the aircraft further comprises in each branch a heat exchanger in an air flow duct associated with the respective branch, such that an air flow for conditioning of a system and/or cabin zone is separately coolable.

* * * * *